(12) United States Patent
Jackson et al.

(10) Patent No.: US 9,746,089 B2
(45) Date of Patent: Aug. 29, 2017

(54) SPOOL VALVE ASSEMBLY WITH STATIONARY INSERT

(71) Applicant: Sonnax Industries, Inc., Bellows Falls, VT (US)

(72) Inventors: Scott C. Jackson, Chester, VT (US); Patrick A. Keller, Keene, NH (US); Maura J. Stafford, Warner Robins, GA (US); Eric W. Streed, Surry, NH (US); Robert C. Warnke, Spooner, WI (US)

(73) Assignee: Sonnax Industries, Inc., Bellows Falls, VT (US)

( * ) Notice: Subject to any disclaimer, the term of this patent is extended or adjusted under 35 U.S.C. 154(b) by 200 days.

(21) Appl. No.: 14/685,163

(22) Filed: Apr. 13, 2015

(65) Prior Publication Data

US 2015/0292634 A1 Oct. 15, 2015

Related U.S. Application Data

(60) Provisional application No. 61/978,561, filed on Apr. 11, 2014, provisional application No. 61/980,647, filed on Apr. 17, 2014.

(51) Int. Cl.
| | |
|---|---|
| *F16K 11/07* | (2006.01) |
| *F16K 27/04* | (2006.01) |
| *B23P 6/00* | (2006.01) |

(52) U.S. Cl.
CPC .............. *F16K 11/07* (2013.01); *B23P 6/00* (2013.01); *F16K 27/041* (2013.01)

(58) Field of Classification Search
CPC ........... F16K 11/07; F16K 27/041; B23P 6/00
See application file for complete search history.

(56) References Cited

U.S. PATENT DOCUMENTS

| | | | |
|---|---|---|---|
| 3,068,795 A | 12/1962 | Lauck | |
| 3,557,824 A | 1/1971 | Krehbiel et al. | |
| 3,719,199 A | 3/1973 | Mentink | |
| 4,516,471 A | 5/1985 | Duffy | |
| 4,832,081 A | 5/1989 | Amrhein et al. | |
| 6,848,473 B2 | 2/2005 | Fiala et al. | |
| 6,990,996 B2 * | 1/2006 | Stafford | F16H 61/14 137/454.2 |
| 8,234,784 B2 | 8/2012 | Younger | |
| 8,841,786 B2 | 9/2014 | Tucker et al. | |
| 8,955,533 B2 | 2/2015 | Stafford | |
| 9,447,871 B2 * | 9/2016 | Mangiagli et al. | ... F16H 61/029 |
| 2013/0283763 A1 * | 10/2013 | Podgorski et al. | F02C 7/232 60/39.281 |

* cited by examiner

*Primary Examiner* — Kevin Lee
(74) *Attorney, Agent, or Firm* — Downs Rachlin Martin PLLC

(57) ABSTRACT

Valve assemblies and associated methods are disclosed that may include a spool valve and one or more stationary inserts. In some examples, the stationary inserts may be configured to be fixed within a valve bore of a valve body to provide a fluid seal between an outer surface of the insert and the valve bore. Embodiments may also include valve assembly repair kits that may include a spool valve and a stationary insert for repairing a malfunctioning spool valve and methods for installing the same.

33 Claims, 6 Drawing Sheets

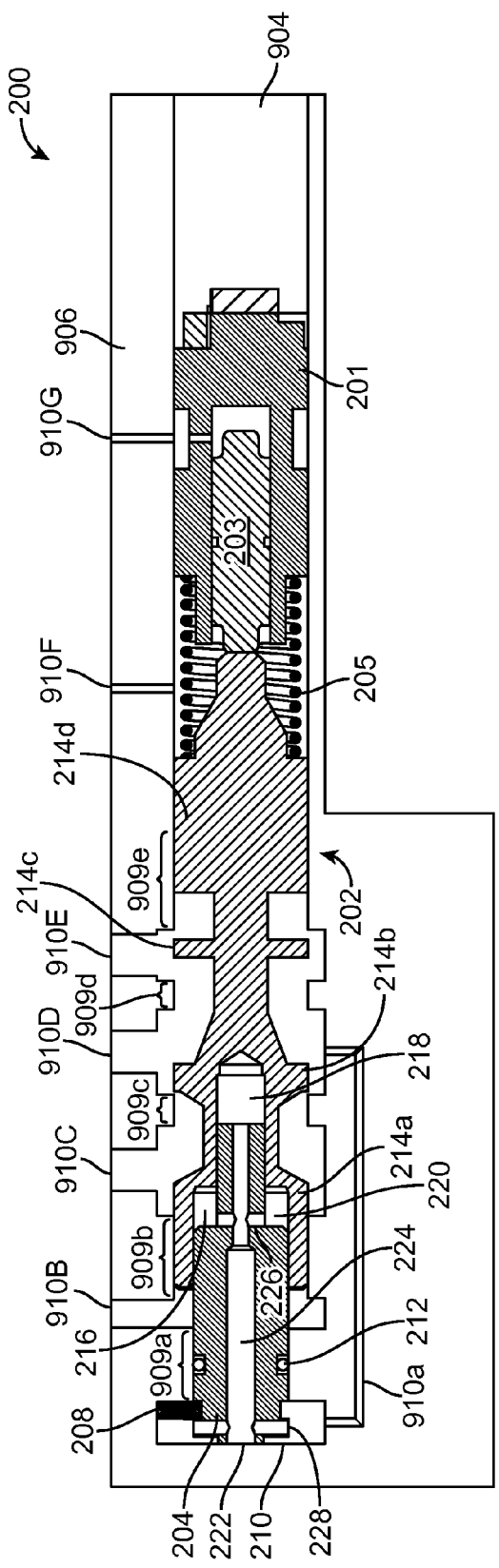
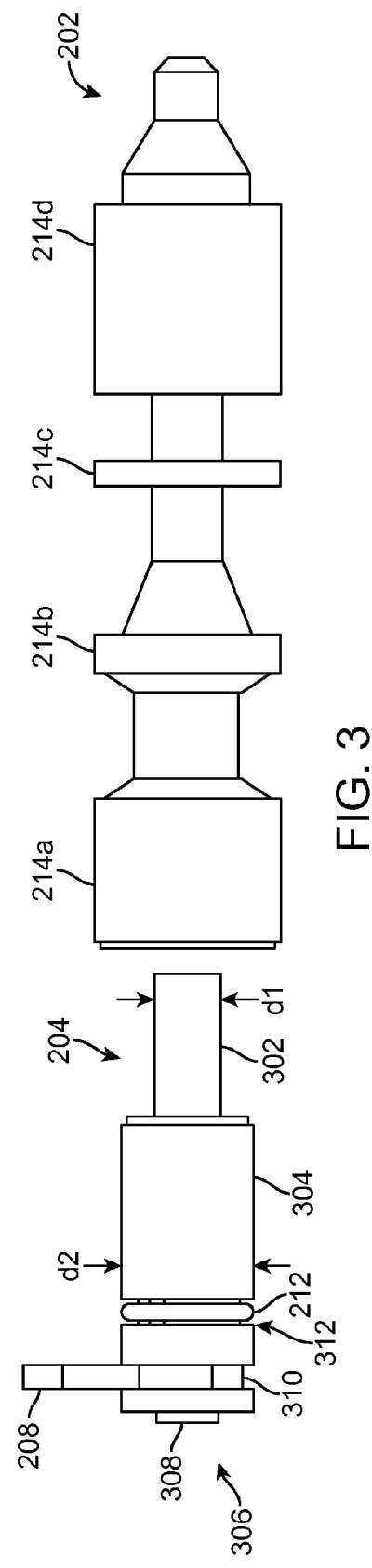
FIG. 2
FIG. 3

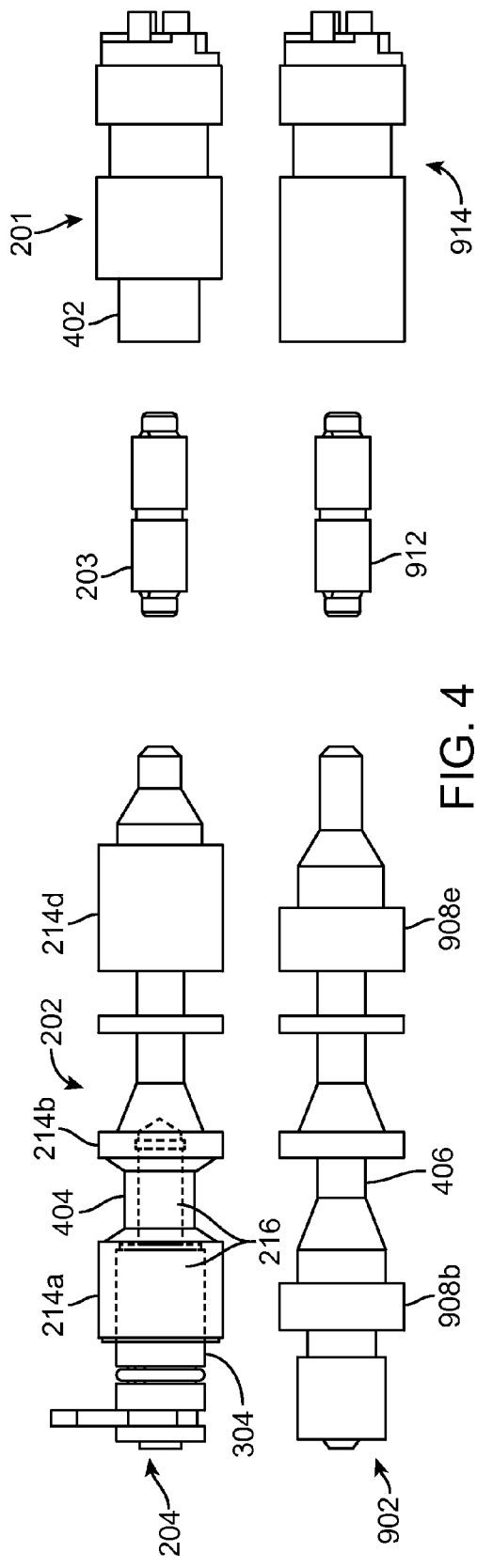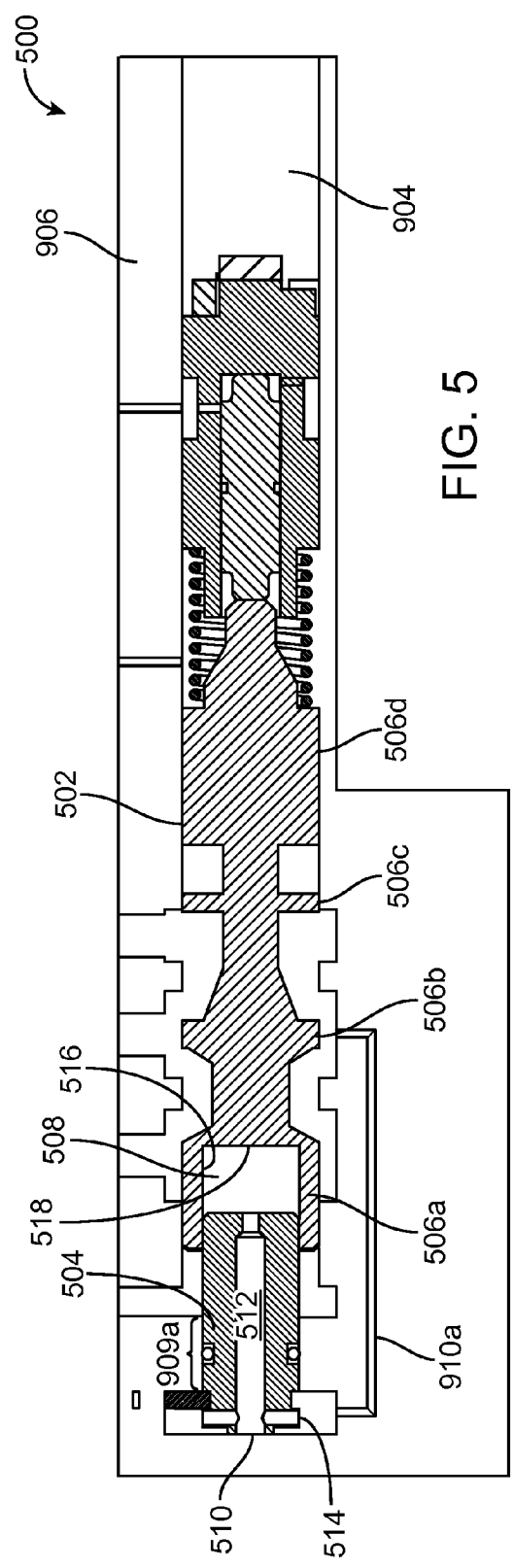
FIG. 4
FIG. 5

US 9,746,089 B2

SPOOL VALVE ASSEMBLY WITH STATIONARY INSERT

RELATED APPLICATION DATA

This application claims the benefit of priority of U.S. Provisional Patent Application Ser. No. 61/978,561, filed Apr. 11, 2014, and titled Internal Balance Pressure Regulator Assembly, and U.S. Provisional Patent Application Ser. No. 61/980,647, filed Apr. 17, 2014, and titled Converter Limit Valve, both of which are incorporated by reference herein in their entireties.

FIELD OF THE INVENTION

The present invention generally relates to the field of spool valves. In particular, the present invention is directed to spool valve assemblies having one or more stationary inserts.

BACKGROUND

Spool valves are used in a variety of applications to control fluid flow and fluid pressure in a system. Spool valves are typically disposed within a valve bore of a valve body and have one or more lands that are sized for sealing engagement with the valve bore. A spool valve is typically configured for reciprocal motion within the valve bore to control fluid flow among a plurality of ports in the valve body in fluid communication with the valve bore.

FIGS. 9 and 10 illustrate an exemplary prior art spool valve assemblies 900 and 1000. Exemplary assembly 900 is configured as a pressure regulator valve for use in an automobile transmission and exemplary assembly 1000 is configured as a torque converter pressure limit valve for use in an automobile transmission. As shown in FIG. 9, example prior art assembly 900 may include spool valve 902 slidably disposed within valve bore 904 of valve body 906. Spool valve 902 may have a plurality of lands 908a-e configured and dimensioned for sealing engagement with valve bore 904. Valve bore 904 may have a plurality of portions 909a-e that are configured and dimensioned for sealing engagement with corresponding ones of the plurality of lands 908a-e. Valve body 906 may also have a plurality of ports 910a-g in fluid communication with valve bore 904. Example assembly 900 may also include boost valve 912 disposed within boost sleeve 914 and spring 916 for resiliently biasing spool valve 902 to a normal position shown in FIG. 9. During use, a position of spool valve 902 within valve bore 904, which determines the direction of pressurized fluid flow among ports 910a-g, is determined by a balance of forces acting on the valve, including forces from pressurized fluid from one or more of ports 910a-g, a force from spring 916, and a force, if any, from boost valve 912. For example, port 910a includes a channel providing fluid communication between port 910d and land 908a. As pressure at port 910d increases, fluid pressure at port 910a and land 908a may begin to increase, eventually causing valve 902 to move to the right as viewed from the perspective of FIG. 9.

Exemplary assembly 1000 has similar components and functionality, and may include spool valve 1002 slidably disposed within valve bore 1004 of valve body 1006. In the illustrated example, valve bore 1004 may have a closed end 1005. Spool valve 1002 may have a plurality of lands 1008a-c configured and dimensioned for sealing engagement with valve bore 1004. Valve bore 1004 may have a plurality of portions 1009a-d that are configured and dimensioned for sealing engagement with corresponding ones of the plurality of lands 1008a-c. Valve body 1006 may also have a plurality of ports 1010a-e in fluid communication with valve bore 1004. Example assembly 1000 may also include plug 1012 secured by clip 1014 and spring 1016 for resiliently biasing spool valve 1002 in a leftward direction when viewed from the perspective shown in FIG. 10. In the illustrated example, ports 1010a and 1010d may be exhaust ports, and port 1010c may provide pressurized fluid to port 1010b when valve 1002 is in a normal position and land 1008b is not blocking port 1010b (position not illustrated). When pressurized fluid is passing from port 1010c to port 1010b, a portion of the fluid may pass through orifice 1018 and into port 1010e and act on faces of lands 1008a and 1008b. Because land 1008b has an outer diameter that is greater than an outer diameter of land 1008a, pressurized fluid from orifice 1018 acting on the two lands will create a pressure differential with a net force forcing valve 1002 in a rightward direction when viewed from the perspective shown in FIG. 10. When the fluid force from fluid passing through orifice 1018 becomes great enough to overcome the force of spring 1016, the valve will begin to move to the right, causing land 1008b to begin to close and eventually fully close port 1010b. In one example, exemplary assembly 1000 may be an automobile transmission torque converter pressure limit valve, port 1010c may provide fluid communication for "priority" pressure also sometimes referred to as "line" pressure to valve bore 1004, and port 1010b may provide fluid communication between the valve bore and a converter clutch circuit ("CCL").

It can be common for fluid leakage to begin to occur in spool valve assemblies such as assemblies 900 and 1000, such as fluid leakage between one or more of the spool valve lands (e.g., one or more of lands 908a-e of assembly 900 or lands 1008a-c of assembly 1000) and adjacent valve bore portions (e.g., corresponding valve bore portions 909a-e of assembly 900 and 1009a-d of assembly 1000) due to excessive wear on one or more of the lands and valve bore portions. Such fluid leakage can alter the balance of forces acting the spool valve, e.g., valve 902 or valve 1002, resulting in the spool valve being in an improper location and not properly routing fluid among the associated valve bore ports, e.g., 910a-g or 1010a-e. Depending on the severity of the leakage and the type of valve, such leakage can have a variety of negative consequences, including damage to transmission components, causing the transmission to delay shifting or not shift at all, or otherwise cause drivability and longevity issues. For example, exemplary lands 908a (FIG. 9) and the combination of lands 1008a and 1008b (FIG. 10) are balance pressure lands that cooperate with other valve components to cause the associated spool valve 902, 1002 to move to the right as viewed from the perspective of FIGS. 9 and 10, and reduce fluid pressure in one or more of the fluid ports. If leakage begins to occur between balance land 908a or 1008a and 1008b and associated valve bore portion 909a, and 1009a, 1009b, the assembly 900, 1000 may not properly regulate fluid pressure, resulting in downstream transmission components receiving incorrect fluid pressure. Leakage at other ones of lands 908b-e or 1008b-c and associated valve bore portions may similarly cause the associated valve assembly to malfunction. To restore proper system operation, the malfunctioning spool valve assembly must be repaired or replaced.

SUMMARY OF THE DISCLOSURE

In one implementation, the present disclosure is directed to a method of repairing a valve assembly having an existing spring and an existing spool valve, the existing spool valve reciprocally disposed within a valve bore of a valve body and having a plurality of lands, the valve bore having a first portion configured and dimensioned for sealing engagement with one of the plurality of lands. The method may include removing the spool valve, and installing a replacement spool valve in the valve bore for reciprocal movement therein. In one embodiment, the replacement spool valve may have at least one less land than the existing spool valve. In some embodiments, the method may also include installing a stationary insert in the valve bore with at least a portion of the stationary insert located in the first portion of the valve bore, the stationary insert being configured and dimensioned to be fixed in the valve bore and provide a fluid seal between an outer surface of the stationary insert and the valve bore.

Another implementation may include a kit for replacing an existing spool valve of an existing valve assembly, the existing spool valve being reciprocally disposed within a valve bore of a valve body and having a plurality of lands, the valve bore having a first portion configured and dimensioned for sealing engagement with one of the plurality of lands. The kit may include a stationary insert configured and dimensioned to be disposed within the first portion of the valve bore and provide a fluid seal between an outer surface of the stationary insert and the valve bore. The kit may also include a replacement spool valve having at least one less land than the existing spool valve and that is configured and dimensioned to be reciprocally disposed within the valve bore.

Yet another implementation may include a kit for repairing any one of a plurality of existing valve assemblies, each of the existing valve assemblies including an existing spool valve disposed in corresponding valve bore, and each of the existing spool valves having a plurality of lands including a balance pressure land. In some embodiments, each of the valve bores may have a balance pressure portion configured and dimensioned for sealing engagement with the balance pressure land of a corresponding existing spool valve, wherein at least one of the existing spool valves has a different size balance pressure land than other ones of the existing spool valves. In some embodiments, the kit may include a plurality of stationary inserts each having a different outer diameter, where the outer diameter of each of the stationary inserts may be substantially the same as one or more of the outer diameters of the existing spool valve balance lands, the stationary inserts being configured and dimensioned for installation in the balance land portion of one or more of the valve bores. In some embodiments, the kit may include a replacement spool valve having one less land than the existing spool valves that may be configured and dimensioned to be reciprocally disposed in any one of the valve bores of the plurality of existing spool valves.

Yet another implementation may include a pressure regulator valve (PRV) assembly configured and dimensioned to be disposed within a valve bore of a valve body, the valve body including a balance pressure port. The PRV assembly may include a spool valve configured to be slidably disposed within the valve bore, the spool valve having a plurality of lands sized for sealing engagement with the valve bore, and a stationary insert configured and dimensioned to be fixed within the valve bore to provide sealing engagement therewith. In some embodiments, the stationary insert may have a fluid passageway for routing pressurized fluid from the balance pressure port to the spool valve, where adjacent ends of said spool valve and said stationary insert cooperate to form a cavity in fluid communication with said fluid passageway.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2 shows an exemplary spool valve assembly including a stationary insert, replacement spool valve, boost valve and sleeve, and spring all disposed within a valve bore;

FIG. 3 shows the stationary insert and spool valve of FIG. 2;

FIG. 4 compares components of valve assembly of FIG. 2 to the components of the prior art valve assembly shown in FIG. 9;

FIG. 5 shows another exemplary embodiment of a valve assembly;

DETAILED DESCRIPTION

Embodiments of the present disclosure may include valve assemblies including a spool valve configured for sliding engagement with a valve bore of a valve body and a stationary insert configured to be fixed within the valve bore to provide a fluid seal therebetween. In some embodiments, stationary inserts may be configured to route transmission fluid from a port in the valve body to the spool valve. In other embodiments, the stationary insert may completely block fluid flow through a portion of the valve bore. Further, in some embodiments, stationary inserts may be configured to replace the functionality of a land of an existing spool valve and a replacement spool valve having at least one less land than the existing spool valve may be installed. Such systems may provide a variety of benefits, including providing a replacement valve kit for replacing a malfunctioning spool valve having fluid leakage between the spool valve and the valve bore. In some embodiments, such a kit may be a drop-in kit that may be used to repair a leaking spool valve without the need for any costly machining operations, including any need to machine the valve bore, which may reduce time and costs associated with repairing the valve.

Figure 1:
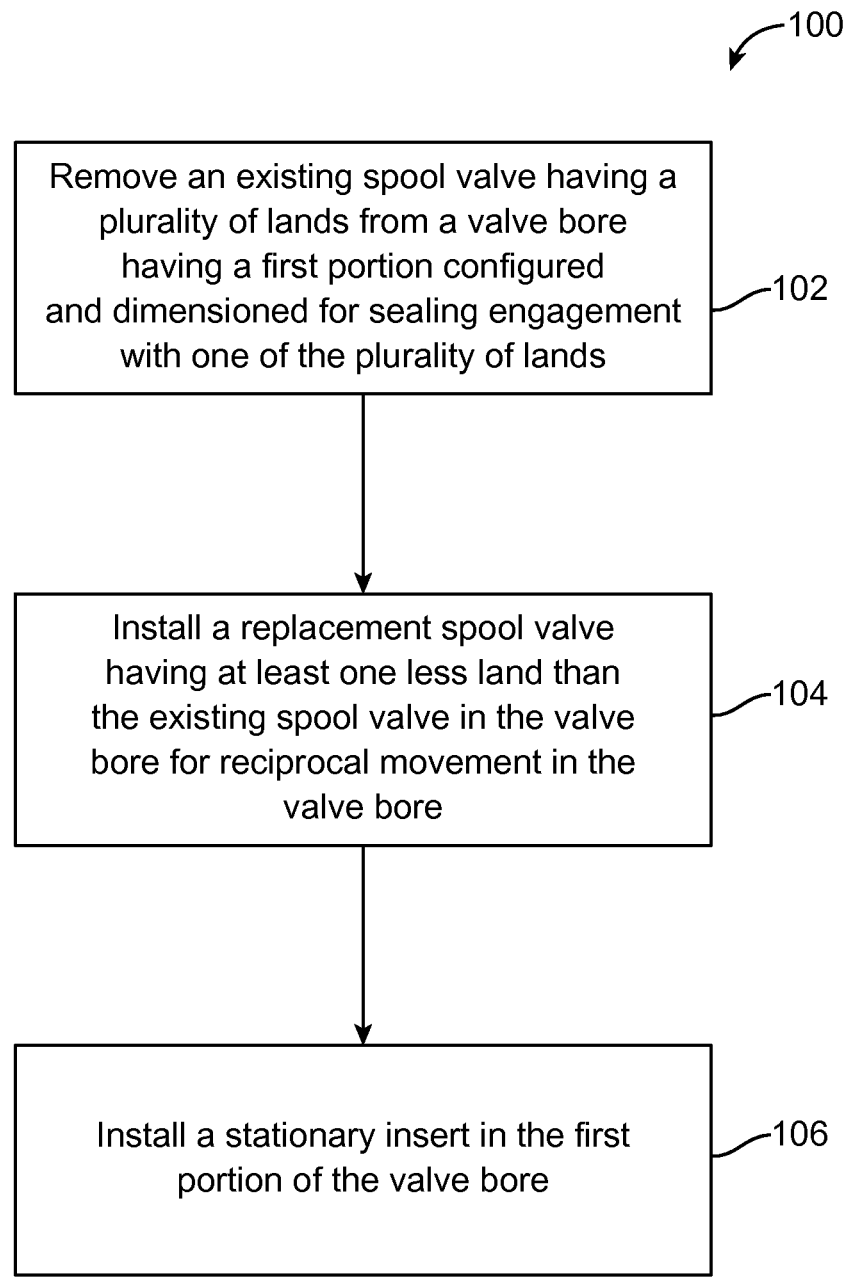
FIG. 1 is a flow chart of an exemplary method of repairing a spool valve assembly.

FIG. 1 illustrates an exemplary method 100 of repairing an existing valve assembly having an existing spring and an existing spool valve. The existing spool valve may be reciprocally disposed within a valve bore of a valve body and may have a plurality of lands. In some embodiments, the valve bore may have a first portion configured and dimensioned for sealing engagement with one of the plurality of lands. The exemplary method may include, at step 102, removing the spool valve, and at step 104, installing a replacement spool valve in the valve bore for reciprocal movement therein. In some embodiments, the replacement spool valve may have at least one less land than the existing spool valve. And at step 106, the method may include installing a stationary insert in the valve bore with at least a portion of the stationary insert located in the first portion of the valve bore. In some embodiments, the stationary insert may be configured and dimensioned to be fixed in the valve bore and provide a fluid seal between an outer surface of the stationary insert and the valve bore. For example, the stationary insert may be located in a section of the valve bore where fluid leakage was occurring, and may be used to eliminate the fluid leakage while also cooperating with the replacement spool valve to provide the same design pressure response the existing valve assembly was designed to provide. As discussed more below, such a method may be used on a variety of different spool valves to eliminate fluid leakage occurring on various spool valve lands, such as fluid leakage that may be occurring on one or more of the lands of prior art valve assemblies 900 and 1000 (FIGS. 9 and 10) discussed above.

Figure 9:
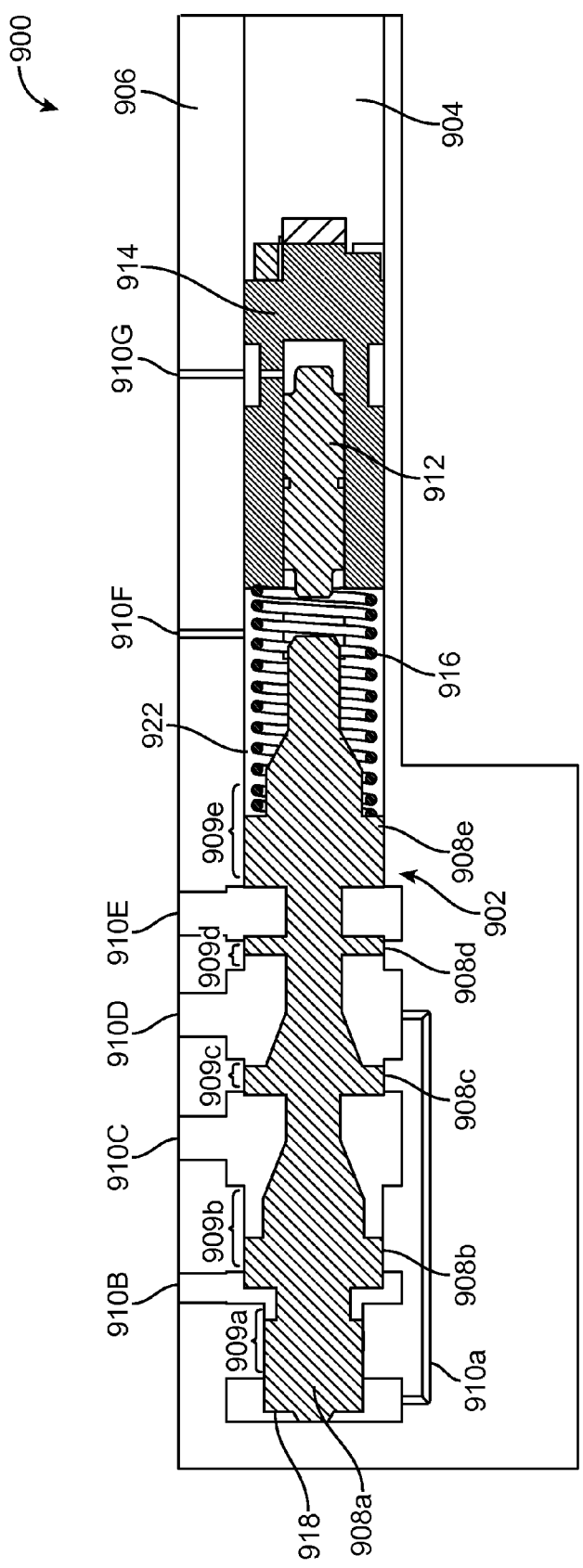
FIG. 9 shows an exemplary prior art valve assembly that may be repaired with embodiments of the present disclosure.

FIGS. 2-4 illustrate an exemplary valve assembly 200 and associated components made in accordance with the present disclosure for repairing exemplary prior art valve assembly 900 (FIG. 9). Exemplary assembly 200 (FIG. 2) may include replacement spool valve 202 and stationary insert 204, which may be disposed in prior art valve bore 904 of valve body 906 to replace prior art spool valve 902 (FIG. 9). As will be appreciated, valve assemblies made in accordance with the present disclosure may also be used in new valves. Assembly 200 may also include boost valve sleeve 201 having boost valve 203 slidably disposed therein and spring 205. In the illustrated example, stationary insert 204 may be configured and dimensioned to be fixed in valve bore 904 with retaining clip 208 with at least a portion of the stationary insert located in valve bore portion 909a of the valve bore where land 908a of prior art spool valve 902 (FIG. 9) was previously located. By locating insert 204 in valve bore portion 909a, the insert may provide a fluid seal between an outer surface of the stationary insert and valve bore 904, where fluid leakage may have previously been occurring. For example, as discussed above and with reference to FIG. 9, valve bore portion 909a of exemplary prior art valve bore 904 may have excessive wear due to, for example, reciprocal motion of balance land 908a, which may lead to unwanted fluid leakage across the balance land. Returning to FIG. 2, by locating insert 204 in valve bore portion 909a, the insert may prevent further fluid leakage, thereby providing a properly-functioning assembly 200. In the illustrated example, exemplary valve bore 904 may have a closed end 210 and insert 204 may be configured to be fully inserted into the bore so the insert is located proximate, and in some cases, in contact with the closed end. Insert 204 may be sized and configured for sealing engagement with valve bore 904, and in the illustrated example, configured for sealing engagement with portion 909a of the valve bore. Insert 204 may be configured to provide a sealing engagement by any of a variety of means. In the illustrated example, insert 204 may include resilient seal 212 disposed around a circumference of the insert, such as, e.g., an O-ring disposed in a groove, for providing a fluid seal between the insert and valve bore 904. Including a resilient seal may provide the benefit of ensuring insert 204 may be used to repair a variety of valves having varying dimensions due to varying degrees of wear. In other embodiments, insert 204 may be configured and dimensioned to have a press-in fit with bore 904 and may not include a resilient seal such as seal 212.

Exemplary replacement spool valve 202 may be configured and dimensioned to be reciprocally disposed within valve bore 904 and may have a plurality of lands 214a-d that may be configured and dimensioned for sealing engagement with respective valve bore portions 909b-e. As shown in FIG. 2, replacement spool valve 202 may have one less land than the number of lands 908a-e of prior art spool valve 902 (FIG. 9), and the replacement spool valve may have recess 216 having a complementary size and shape to insert 204 so that, as shown in FIG. 2, the replacement spool valve may be slidably disposed over a portion of the stationary insert. In the illustrated example, insert 204 may have a stepped outer surface that, as best seen in FIG. 3, may include a first portion 302 having a first outer diameter d1 and second portion 304 having a second, larger outer diameter d2. Recess 216 of replacement spool valve 202 may have a similar stepped profile to provide a sliding and sealing engagement with first and second portions 302, 304 of insert 204, such that the recess and the insert cooperate to form first fluid cavity 218 (FIG. 2), formed by the first portion and the recess, and second fluid cavity 220 formed by the first and second portions and the recess. Providing an insert with a stepped profile may be advantageous in some valve systems, for example, to provide an extended bearing surface for supporting replacement spool valve 202. For example, a location of valve body ports 910b and 910c (FIG. 2) may limit the possible axial lengths of insert 204 and land 214a of replacement spool valve 202. Second portion 304 of insert 204 may not be an optimal length for providing an adequate bearing surface for spool valve 202 over the full stroke range of the valve. Thus, first portion 302 of insert 204 may provide additional bearing surface length for adequately supporting replacement spool valve 202 over the entire design stroke length while also ensuring proper flow among ports 910c-g.

As shown in FIG. 2, insert 204 may also have fluid passageway 222 for routing fluid from balance port 910a, through the insert, to replacement spool valve 202. In the illustrated example, fluid passageway 222 may be configured to route fluid to first and second fluid cavities 218, 220, via an axial portion 224 extending across a length of the insert for providing fluid communication between port 910a and first fluid cavity 218. Fluid passageway 222 may also include non-axial portion 226 for providing fluid communication between axial portion 224 and second fluid cavity 220. In the illustrated example, axial portion 224 of passageway 222 may be located substantially along a central longitudinal axis of insert 204. Non-axial portion 226 may intersect the axial portion 224 and may extend across an entire width of first portion 302 of insert 204. In some embodiments, non-axial portion 226 may extend along an axis that is substantially perpendicular to axial portion 224. In other embodiments, a variety of other fluid passageway arrangements may be used, including separate fluid passageways for routing fluid to first and second cavities 218, 220, a non-axial portion that does not extend across the entire width of insert 204, among others. As shown in FIG. 2, fluid passageway 222 may also include inlet portion 228 for receiving fluid from port 910a. In the illustrated example, inlet portion 228 may extend across an entire width of insert 204 and may extend along an axis that is substantially perpendicular to axial portion 224. Such an arrangement may allow for end 306 (FIG. 3) to come into contact with closed end 210 of valve bore 904 while still providing fluid communication through insert 204. Thus, stationary insert 204 and replacement spool valve 202 may be used as a replacement for prior art spool valve 902 that eliminates balance land 908a of the prior art valve while providing the same pressure response. In the illustrated example, the surfaces of recess 216 that are not substantially parallel to a central longitudinal axis of valve 202 may act as control surfaces for receiving pressurized fluid from port 910a and creating a force in substantially the same manner as face 918 (FIG. 9) of balance land 908a was originally configured to provide when no fluid leakage is occurring. In some embodiments, a surface area of recess 216 that pressurized fluid acts on is substantially the same as a surface area of face 918 of balance land 908a of prior art valve 902. In the illustrated embodiment, the pressure surfaces of recess 216 may be broken up into a first surface located in fluid cavity 218 and a second surface located in fluid cavity 220, such that the combined forces of pressurized fluid acting on valve 202 via the fluid cavities is substantially the same as the force that would have been created by the pressurized fluid acting on balance land 908a. Thus, the illustrated replacement spool valve 202 may have one less land than a valve being replaced and recess 216 may act as the pressure surface for the eliminated land.

FIG. 3 illustrates replacement spool valve 202 and stationary insert 204 in greater detail. As shown, end 306 of stationary insert 204 may include protrusion 308 for providing spacing from closed end 210 (FIG. 2) of valve body 906. Insert 204 may also include retaining clip recess 310 sized for receipt of retaining clip 208 for securing the insert in valve bore 904, and resilient seal groove 312 for receipt of resilient seal 212. In some embodiments, insert 204 may have a plurality of resilient seal grooves for receipt of a plurality of resilient seals. FIG. 4 provides a comparison between components of prior art valve assembly 900 and exemplary valve assembly 200. FIG. 4 shows insert 204 fully inserted into recess 216 of replacement spool valve 202. As shown, in the illustrated example, a total length of insert 204 and spool valve 202 when fully inserted is substantially the same as a total length of prior art spool valve 902, which exemplary assembly 200 is designed to replace. As also shown, exemplary land 214a has a greater axial length than prior art land 908b, which may provide a variety of benefits. For example, as can be seen by the outline of insert 204 inserted within land 214a, having a greater axial length provides a greater bearing surface for supporting valve 202 along second portion 304 of the insert. In addition, the greater axial length of land 214a, as well as the axial mating surfaces of recess 216 and insert 204 may provide an increased sealing engagement as compared to an existing valve assembly, such as assembly 900. Also, as can be seen in FIG. 4, recess 216 may extend through a plurality of lands, e.g., 214a and 214b. In the illustrated example, recess 216 extends through valley 404 between adjacent lands, 214a, 214b, and an outer diameter of the valley may be greater than corresponding valley 406 of prior art valve 902 to accommodate recess 216 and first portion 302 of insert 204.

As also shown in FIG. 4, land 214d of replacement spool valve 202 has a greater axial length than corresponding land 908e of prior art valve 902. By providing land 908e having a greater length, the land may provide an improved seal as compared to the seal achieved by land 908e of prior art valve 902. For example, as shown in FIG. 9, leakage may being to occur where land 908e comes into contact with valve bore portion 909e due to excessive wear. An adjacent section of bore 904 generally identified by reference numeral 922, however, may have had little to no contact with land 908e, resulting in section 922 being unworn. Returning to FIG. 4, land 214d of replacement spool valve 202 may have a greater axial length so that a portion of the land may come into contact with unworn section 922 of valve bore 904, to thereby provide sealing engagement between the land and the valve bore. Providing lands with increased length may also improve hydraulic stability by reducing oscillations due to an increased mass associated with the longer-length land. In other embodiments, land 214d may have a shorter axial length but may be located further to the right, when viewed from the perspective of FIG. 4, to allow for sealing engagement with unworn section 922 of valve bore 904.

With reference to FIGS. 2 and 4, boost valve sleeve 201 may include spring shoulder 402 for receipt of spring 205, thereby overlapping a portion of the spring over an end of the sleeve, which may improve performance by properly locating the spring within valve bore 904 to ensure there is no inadvertent contact between moving valve components 202, 203 and an inner diameter of the spring. Spring shoulder 402 also allows for a greater-length spring than could otherwise be used without the shoulder. For example, spring 205 may have substantially the same length as spring 916, and in some cases, spring 916 may be used in assembly 200, despite the longer axial length of land 214d. Replacement boost valve 203 may have a configuration that is substantially the same as boost valve 912, and in some embodiments, boost valve 912 may be re-used in valve assembly 200. In one embodiment, a kit may be provided for repairing a valve assembly, such as assembly 900. For non-limiting example, assembly 900 may be a pressure regulator valve for one or more of Aisin AW's transmission model numbers 55-50SN and 55-51SN, General Motor's transmission model number AF23/33; or Nissan's transmission model number RE5F22A. In another embodiment, a kit made in accordance with the present disclosure may be used to replace a pressure regulator valve in a variety of other automotive transmissions. A replacement kit made in accordance with example assembly 200 may include boost valve 203, boost sleeve 201, spool valve 202, insert 204, retaining clip 208, and seal 212.

FIG. 5 illustrates an alternative valve assembly 500 having a similar configuration as assembly 200, including replacement spool valve 502 that is configured and dimensioned to be reciprocally disposed within valve bore 904 and having a plurality of lands 506a-d configured and dimensioned for sealing engagement with the valve bore, and stationary insert 504. As with valve assembly 200, insert 504 of assembly 500 is configured to be fixed within bore 904 at valve bore portion 909a and provide a fluid seal in a location where a land, e.g., land 908a, was previously located. However, unlike insert 204 and spool valve 202, insert 504 is substantially cylindrical, and does not have a stepped portion, such that the insert and spool valve 502 cooperate to form a single fluid cavity 508 for receipt of pressurized fluid. Replacement spool valve 502 may include recess 516 that may be substantially cylindrical and that may include control surface 518 extending substantially perpendicular to a central longitudinal axis of the spool valve. Control surface 518 may have a surface area that is substantially the same as a surface area of a face of a land being replaced, e.g., face 918 of land 908a. Exemplary insert 504 may have fluid passageway 510 that may include an axial portion 512 extending substantially along an entire length of the insert and an inlet portion 514 for routing fluid from port 910a to the axial portion.

Figure 6:
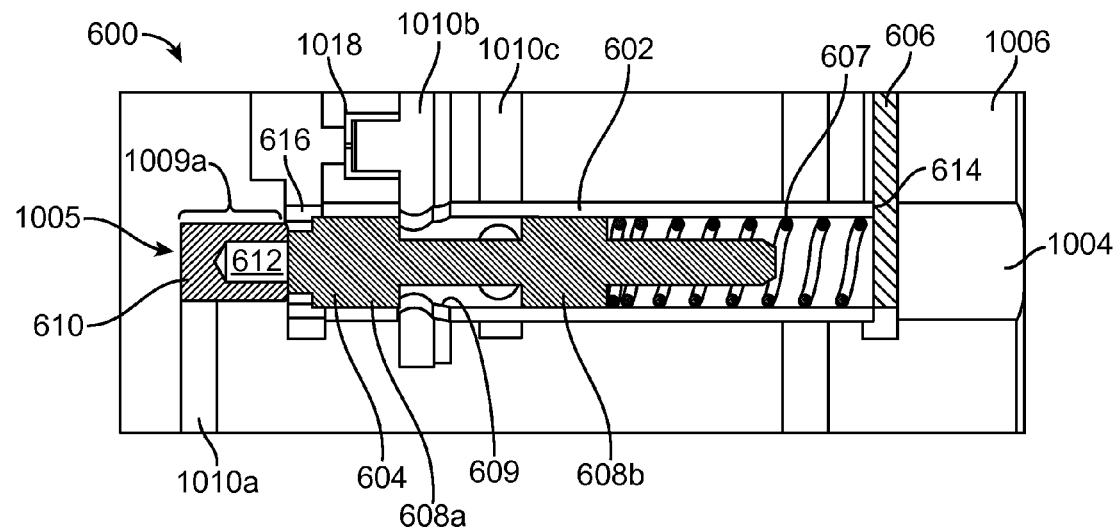
FIG. 6 shows another exemplary embodiment of a valve assembly.
Figure 7:
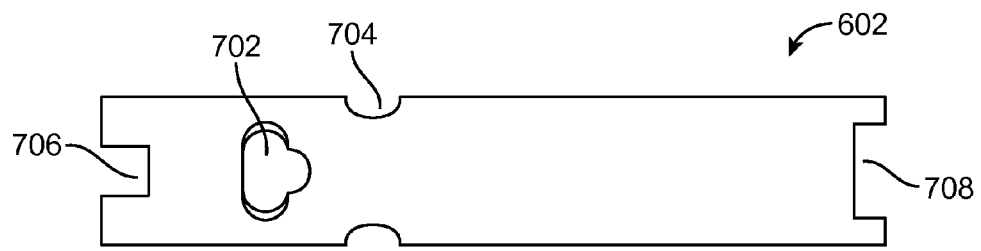
FIG. 7 shows the sleeve of the assembly of FIG. 6.
Figure 8:
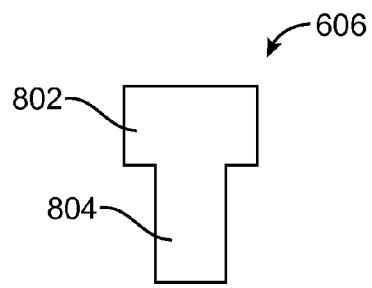
FIG. 8 shows the retainer of the assembly of FIG. 6.

FIGS. 6-8 illustrate another exemplary embodiment of a replacement spool valve assembly 600 made in accordance with the present disclosure. Exemplary assembly 600 may be configured to repair prior art assembly 1000 (FIG. 10), and may include, as shown in FIG. 6, sleeve 602 that may be configured and dimensioned to have a press fit with valve bore 1004, and replacement spool valve 604 that may be configured to be reciprocally disposed in the sleeve. Sleeve 602 may be secured in valve bore 1004 with retainer 606 and assembly 600 may include replacement spring 607 for resiliently biasing replacement valve 604 to a normal position shown in FIG. 6. Replacement spool valve 604 may have a plurality of lands 608a and 608b that may be configured and dimensioned for sealing engagement with inner wall 609 of sleeve 602. As shown, replacement spool valve 604 may have one less land than the number of lands 1008a-c of existing prior art spool valve 1002. Assembly 600 may also include stationary insert 610 that may be configured and dimensioned to provide a fluid seal between an outer surface of the stationary insert and valve bore portion 1009a. In the illustrated example, stationary insert may be a plug configured and dimensioned to be fixed in closed end 1005 of bore 1004 and may be fixed in place with a press fit with valve bore portion 1009a to minimize leakage. In alternative embodiments, insert 610 may include one or more resilient seals such as, for example, one or more O-rings disposed on an outer surface of the insert for forming a fluid seal between the insert and valve bore portion 1009a. Insert 610 may include threaded hole 612 for ease of installation. As shown, sleeve 602 may be located longitudinally adjacent stationary insert 610 such that the sleeve may have first and second ends 614, 616 extending across a first longitudinal section of valve bore 1004, and stationary insert 610 may be positioned in a second longitudinal section of the valve bore that is adjacent the first longitudinal section.

Exemplary assembly 600 may provide a drop-in replacement where no machining of valve bore 1004 is required for repairing a prior art assembly 1000 (FIG. 10) that may have fluid leakage across one or more of lands 1008a-c. In the exemplary embodiment, replacement valve 604 and sleeve 602 may cooperate to eliminate fluid leakage that may have been occurring across lands 1008b or 1008c by providing an unworn surface in inner wall 609 of the sleeve that may be configured and dimensioned to provide a fluid seal with lands 608a and 608b of the replacement valve.

Stationary insert 610 and replacement valve 604 may cooperate to eliminate fluid leakage that may have been occurring across land 1008a. In the illustrated example, stationary insert 610 is configured to completely block fluid flow through valve bore portion 1009a. In replacement assembly 600, pressurized fluid from orifice 1018 may no longer create a pressure differential as was present in prior art assembly 1000 due to the area difference between prior art lands 1008a and 1008b (see FIG. 10). Instead, pressurized fluid from orifice 1018 may now create a fluid force on replacement valve 604 by acting on the face of land 608a. In the illustrated embodiment, replacement spring 607 may be designed to provide replacement assembly 600 with substantially the same pressure response as prior art assembly 1000 by accounting for replacement assembly 600 no longer having land 1008a and the associated pressure differential from fluid from orifice 1018. Replacement spring 607 may also be designed to account for replacement valve lands 608a and 608b having smaller outer diameters than prior art lands 1008b and 1008c due to the wall thickness of sleeve 602.

Figure 10:
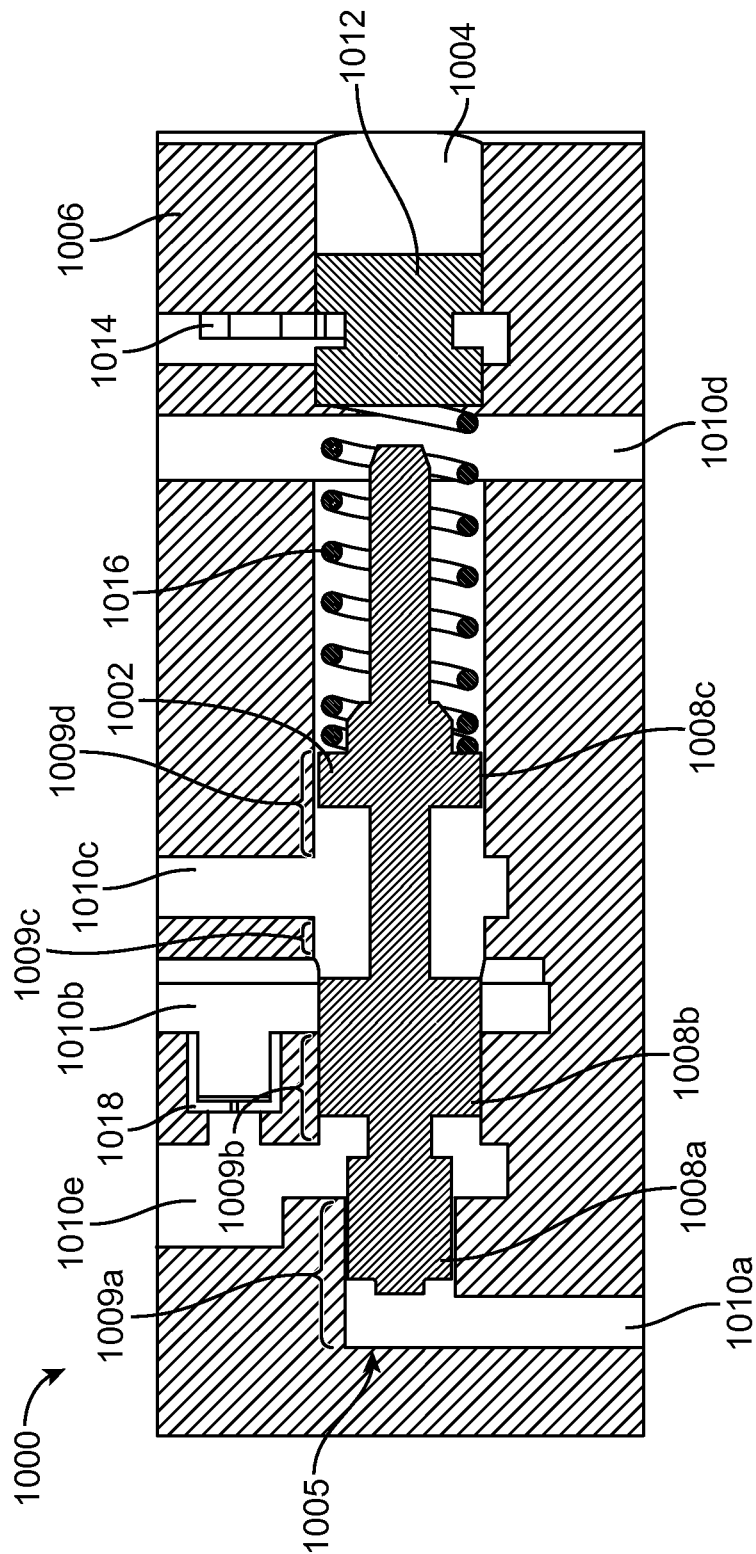
FIG. 10 shows another exemplary prior art valve assembly that may be repaired with embodiments of the present disclosure.

FIGS. 7 and 8 illustrate sleeve 602 and retainer 606 in greater detail. As shown in FIG. 7, sleeve 602 may have openings 702 and 704 for providing fluid communication between ports 1010b and 1010c (FIG. 6) with replacement valve 604. In the illustrated embodiment, openings 702 and 704 may be located in different circumferential locations on the sleeve, e.g., spaced approximately 90 degrees apart, to minimize the impact of the openings on the strength of the sleeve. Sleeve 602 may also have notch 706 or other opening for providing fluid communication between orifice 1018 and valve 604 and may have notch 708 that may have a complementary size and shape with retainer 606 for slidably receiving the retainer and maintaining the sleeve in the proper circumferential orientation and axial location. As shown in FIG. 10, retainer 606 may have a t-shape with a first, wider portion 802 and a second, narrower portion 804 that is sized to have a close fit with notch 708 and to provide a secure base for replacement spring 607.

In one embodiment, a kit may be provided for repairing any one of a plurality of existing valve assemblies, such as assembly 1000, where at least one of spool valves 1002 has a different size balance pressure land 1008a than other ones of the existing spool valves. For non-limiting example, assembly 1000 may be a converter pressure limit valve for one of Ford's model 5R110W transmissions from year 2003 or newer, which include types 1, 2, and 3 spool valves, which each have a different-sized balance land 1008a but the other lands 1008b and 1008c are the same for all three types. A replacement kit made in accordance with example assembly 600 may include a first stationary insert having substantially the same outer diameter of balance land 1008a for one of types 1-3, a second insert having substantially the same outer diameter as balance land 1008a for another one of types 1-3, and in some embodiments, a kit may have a third stationary insert for the third-sized balance land. Thus, an exemplary kit may include a plurality of stationary inserts each having a different outer diameter, where the outer diameter of each of the stationary inserts is substantially the same as one or more of the outer diameters of existing spool valve balance lands. In the illustrated embodiment, a kit may also include a single replacement spool valve 604 having one less land than the existing spool valve 1002 for any of the types 1-3 prior art spool valves that may be configured and dimensioned to be reciprocally disposed in any one of the types 1-3 valve bores of existing spool valves. An exemplary kit may also include a sleeve for installation in any of the types 1-3 valve bores, and may include one replacement spring 607 configured to be installed in any one of the types 1-3 valve bores, or in some embodiments, a first spring 607 for use in types 1 and 2 and a second differently configured spring for type 3 valves.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of repairing a valve assembly having an existing spring and an existing spool valve, the existing spool valve reciprocally disposed within a valve bore of a valve body and having a plurality of lands, the valve bore having a first portion configured and dimensioned for sealing engagement with one of the plurality of lands, the method comprising:
  removing the spool valve;
  installing a replacement spool valve in the valve bore for reciprocal movement therein, the replacement spool valve having at least one less land than the existing spool valve; and
  installing a stationary insert in the valve bore with at least a portion of the stationary insert located in the first portion of the valve bore, the stationary insert being configured and dimensioned to be fixed in the valve bore and provide a fluid seal between an outer surface of the stationary insert and the valve bore.

2. The method according to claim 1, wherein said installing a stationary insert includes installing the stationary insert to completely block fluid flow through the first portion of the valve bore.

3. The method according to claim 1, wherein said installing a stationary insert includes installing the stationary insert to route pressurized fluid from a fluid port in the valve body, through the stationary insert, to the replacement spool valve.

4. The method according to claim 3, wherein the replacement spool valve has a recess sized and configured to cooperate with the stationary insert to form a cavity for receiving the pressurized fluid routed through the stationary insert.

5. The method according to claim 1, wherein the stationary insert has a stepped outer surface and the replacement spool valve is configured and dimensioned to be slidably disposed over the stepped outer surface.

6. The method according to claim 1, wherein the valve bore has a second portion configured and dimensioned for sealing engagement with a second one of the plurality of lands of the existing spool valve, further wherein said installing a replacement spool valve includes installing a replacement spool valve having a first land having a longer axial length than the second land of the existing spool valve so that a portion of the replacement spool valve land forms a fluid seal with a section of the valve bore adjacent the second portion.

7. The method according to claim 6, further comprising:
installing either the existing spring or a replacement spring having substantially the same length as the existing spring in the valve bore so that a first end of the existing or replacement spring comes into contact with a face of the first land; and
installing a replacement boost sleeve having a shoulder configured to allow a second end of the existing spring or replacement spring to overlap a portion of the replacement boost sleeve.

8. The method according to claim 1, further comprising:
installing a sleeve having a first and second end in the valve bore so that the first and second ends extend across a first longitudinal section of the valve bore;
wherein said installing a replacement spool valve includes installing the replacement spool valve in the sleeve; and
said installing a stationary insert includes installing the stationary insert in a second longitudinal section of the valve bore that is adjacent the first longitudinal section.

9. The method according to claim 1, wherein the valve bore has a closed end, said installing the stationary insert includes installing the stationary insert in the closed end of the valve bore.

10. A kit for replacing an existing spool valve of an existing valve assembly, the existing spool valve being reciprocally disposed within a valve bore of a valve body and having a plurality of lands, the valve bore having a first portion configured and dimensioned for sealing engagement with one of the plurality of lands, the kit comprising:
a stationary insert configured and dimensioned to be disposed within the first portion of the valve bore and provide a fluid seal between an outer surface of the stationary insert and the valve bore; and
a replacement spool valve having at least one less land than the existing spool valve and that is configured and dimensioned to be reciprocally disposed within the valve bore.

11. The kit according to claim 10, wherein the valve body has a plurality of ports for providing fluid communication with the valve bore, said stationary insert including a fluid passageway for providing fluid communication between at least one of the ports and said replacement spool valve.

12. The kit according to claim 11, wherein said replacement spool valve has a recess and said stationary insert has a first end, said recess and said first end having a complementary size and shape for sliding insertion of said first end into said recess.

13. The kit according to claim 12, wherein said replacement spool valve has at least one land, said recess being located within said at least one land, said at least one land being configured and dimensioned to be slidably disposed over said stationary insert and to provide sealing engagement with said valve bore.

14. The kit according to claim 12, wherein said recess and said stationary insert cooperate to form at least one fluid cavity for receiving pressurized fluid from said fluid passageway.

15. The kit according to claim 14, wherein said stationary insert has a stepped outer surface including a first portion having a first outer diameter and a second portion having a second outer diameter that is larger than the first outer diameter, said at least one fluid cavity including a first fluid cavity formed by said first portion and said recess and a second fluid cavity formed by said first and second portions and said recess.

16. The kit according to claim 15, wherein said fluid passageway includes an axial portion extending across a length of the insert for providing fluid communication between the port and said first fluid cavity and a non-axial portion for providing fluid communication between said axial portion and said second fluid cavity.

17. The kit according to claim 10, wherein said kit is a replacement kit for a pressure regulator valve in at least one of Aisin AW's transmission model numbers 55-50SN and 55-51SN, General Motor's transmission model number AF23/33; and JATCO's transmission model number RE5F22A, the plurality of lands including a balance pressure land, said stationary insert being configured and dimensioned to replace the balance pressure land.

18. The kit according to claim 10, wherein the valve bore has a closed end, said stationary insert being configured and dimensioned to be located in the closed end of the valve bore.

19. The kit according to claim 10, wherein the existing valve assembly further includes an existing spring disposed between the existing spool valve and an existing boost valve sleeve, wherein the existing spring does not overlap the existing boost valve sleeve, the kit further comprising a replacement boost valve sleeve having a shoulder for receiving the existing spring and allowing the existing spring to overlap a portion of the replacement boost valve sleeve when the existing spring is disposed between said replacement spool valve and said replacement boost valve sleeve.

20. The kit according to claim 10, wherein the valve bore includes a second portion configured and dimensioned for sealing engagement with a second one of the plurality of lands of the existing spool valve, said replacement spool valve having a land that is configured and dimensioned to provide sealing engagement with a section of the valve bore adjacent the second portion.

21. The kit according to claim 20, wherein said at least one land has an axial length that is greater than an axial length of a corresponding land on the existing spool valve the at least one land is designed to replace.

22. The kit according to claim 10, wherein said stationary insert is configured to completely block fluid flow through the portion of the valve bore said stationary insert is located.

23. The kit according to claim 22, wherein the existing valve assembly further includes a spring having a first spring constant, the kit further comprising a replacement spring having a second spring constant that is different than the first spring constant.

24. The kit according to claim 23, wherein the plurality of lands on the existing spool valve includes first and second lands located in first and second valve bore portions and separated by a valley, a face of the second land having a different surface area than a face of the first land, the valve bore having a port for providing fluid communication to the valley and the first and second lands, wherein said stationary insert is configured to replace the first land and be located in the first portion of the valve bore, a first end of said replacement spool valve including a land configured and dimensioned to be located in the second portion of the valve bore and be in fluid communication with the port.

25. The kit according to claim 24, wherein said kit is a replacement kit for a converter limit valve in Ford's model 5R110W transmissions, the first land of the existing spool valve being a balance pressure land, said stationary insert being configured and dimensioned to replace the balance pressure land.

26. The kit according to claim 10, wherein said replacement kit further comprises a sleeve configured and dimensioned to be disposed within the valve bore, said replacement spool valve configured and dimensioned to be reciprocally disposed within the sleeve, said at least one land configured and dimensioned for sealing engagement with the sleeve.

27. A kit for repairing any one of a plurality of existing valve assemblies, each of the plurality of existing valve assemblies including an existing spool valve disposed in corresponding valve bore, each of the existing spool valves having a plurality of lands including a balance pressure land, each of the valve bores having a balance pressure portion configured and dimensioned for sealing engagement with the balance pressure land of a corresponding existing spool valve, wherein at least one of the existing spool valves has a different size balance pressure land than other ones of the existing spool valves, the kit comprising:

a plurality of stationary inserts each having a different outer diameter, wherein the outer diameter of each of the stationary inserts is substantially the same as one or more of the outer diameters of the existing spool valve balance pressure lands, the stationary inserts being configured and dimensioned for installation in the balance pressure portion of one or more of the valve bores; and a replacement spool valve having one less land than the existing spool valves that is configured and dimensioned to be reciprocally disposed in any one of the valve bores of the plurality of existing spool valves.

28. The kit according to claim 27, wherein each of the valve bores have a closed end, said stationary inserts being configured and dimensioned to be located in the closed ends of the valve bores.

29. The kit according to claim 27, further comprising a sleeve configured and dimensioned to be disposed in any one of the valve bores, said replacement spool valve configured and dimensioned to be reciprocally disposed in the sleeve.

30. The kit according to claim 29, further comprising at least one replacement spring configured to be installed in one or more of the valve bores in operative arrangement with said replacement spool valve and sleeve and one of said stationary inserts.

31. The kit according to claim 27, wherein said kit is designed to replace existing spool valves in at least two of types 1, 2, and 3 converter limit valves in Ford's 5R110W transmissions.

32. The kit according to claim 31, wherein said outer diameter of one of said stationary inserts is substantially the same as an outer diameter of a balance land of one of types 1-3 converter limit valves of Ford's 5R110W transmissions and said outer diameter of another one of said stationary inserts is substantially the same as the outer diameter of a balance land of a different one of types 1-3 converter limit valves of Ford's 5R110W transmissions.

33. The kit according to claim 32, wherein said replacement spool valve is configured and dimensioned to replace an existing spool valve in any one of types 1-3 converter limit valves of Ford's 5R110W transmissions.

* * * * *